US010983483B2

(12) United States Patent
Jaeggi

(10) Patent No.: US 10,983,483 B2
(45) Date of Patent: Apr. 20, 2021

(54) ELECTRONIC WATCH ALLOWING DATA TO BE RECEIVED

(71) Applicant: EM Microelectronic-Marin S.A., Marin (CH)

(72) Inventor: Hugo Jaeggi, Fontaines (CH)

(73) Assignee: EM Microelectronic-Marin S.A., Marin (CH)

( * ) Notice: Subject to any disclaimer, the term of this patent is extended or adjusted under 35 U.S.C. 154(b) by 150 days.

(21) Appl. No.: 15/985,743

(22) Filed: May 22, 2018

(65) Prior Publication Data

US 2018/0348709 A1 Dec. 6, 2018

(30) Foreign Application Priority Data

Jun. 6, 2017 (EP) ..................................... 17174616

(51) Int. Cl.
*G04G 21/00* (2010.01)
*G04G 19/00* (2006.01)
*H02J 7/35* (2006.01)
*G04C 11/00* (2006.01)
*G04R 20/26* (2013.01)
(Continued)

(52) U.S. Cl.
CPC ............ *G04G 21/00* (2013.01); *G04C 11/02* (2013.01); *G04G 5/00* (2013.01); *G04G 19/00* (2013.01); *G04R 20/26* (2013.01); *H02J 7/35* (2013.01); *H04B 10/1141* (2013.01); *H04B 10/807* (2013.01); *H04B 10/60* (2013.01)

(58) Field of Classification Search
CPC ........ G04C 11/02; G04G 21/00; G04G 19/00; G04G 5/00; G04R 20/26; H04B 10/807; H04B 10/1141; H04N 10/60
See application file for complete search history.

(56) References Cited

U.S. PATENT DOCUMENTS 6,643,223 B2 * 11/2003 Fujisawa ................ G04G 19/08
307/116
7,079,451 B2 * 7/2006 Okeya ..................... G04G 19/12
368/47
(Continued)

FOREIGN PATENT DOCUMENTS

FR 2 566 205 A1 12/1985

OTHER PUBLICATIONS

European Search Report dated Oct. 27, 2017, issued in European Application EP 17174616.7, filed Jun. 6, 2017 (with English Translation of Categories of Cited References).

*Primary Examiner* — Sean Kayes
(74) *Attorney, Agent, or Firm* — Oblon, McClelland, Maier & Neustadt, L.L.P.

(57) ABSTRACT

The present invention relates to an electronic watch allowing data to be received, comprising:
An electrical energy source
A control member arranged to be supplied with power by the electrical energy source
A receiver module comprising:
An optical sensor capable of detecting a sequence of light pulses modulated by data, and of converting said sequence into a digital signal
An energy storage element arranged to store electrical energy generated by the optical sensor
A demodulator arranged to be supplied with power by the energy storage element, capable of extracting the data from the digital signal
Transmission means capable of transmitting the extracted data to the control member.

13 Claims, 1 Drawing Sheet

(51) Int. Cl.
  *G04G 5/00*    (2013.01)
  *H04B 10/80*   (2013.01)
  *H04B 10/114*  (2013.01)
  *H04B 10/60*   (2013.01)

(56) References Cited

U.S. PATENT DOCUMENTS

| | | | |
|---|---|---|---|
| 9,529,339 B2 * | 12/2016 | Matsue | G04R 20/04 |
| 2001/0028606 A1 * | 10/2001 | Fujisawa | G04G 19/08 |
| | | | 368/204 |
| 2004/0037172 A1 * | 2/2004 | Okeya | G04G 19/12 |
| | | | 368/204 |
| 2004/0037173 A1 * | 2/2004 | Fujisawa | G04G 19/08 |
| | | | 368/204 |
| 2016/0061960 A1 * | 3/2016 | Matsue | G04R 20/04 |
| | | | 368/47 |
| 2016/0266554 A1 | 9/2016 | Ogasawara et al. | |
| 2016/0299475 A1 | 10/2016 | Baba et al. | |

\* cited by examiner

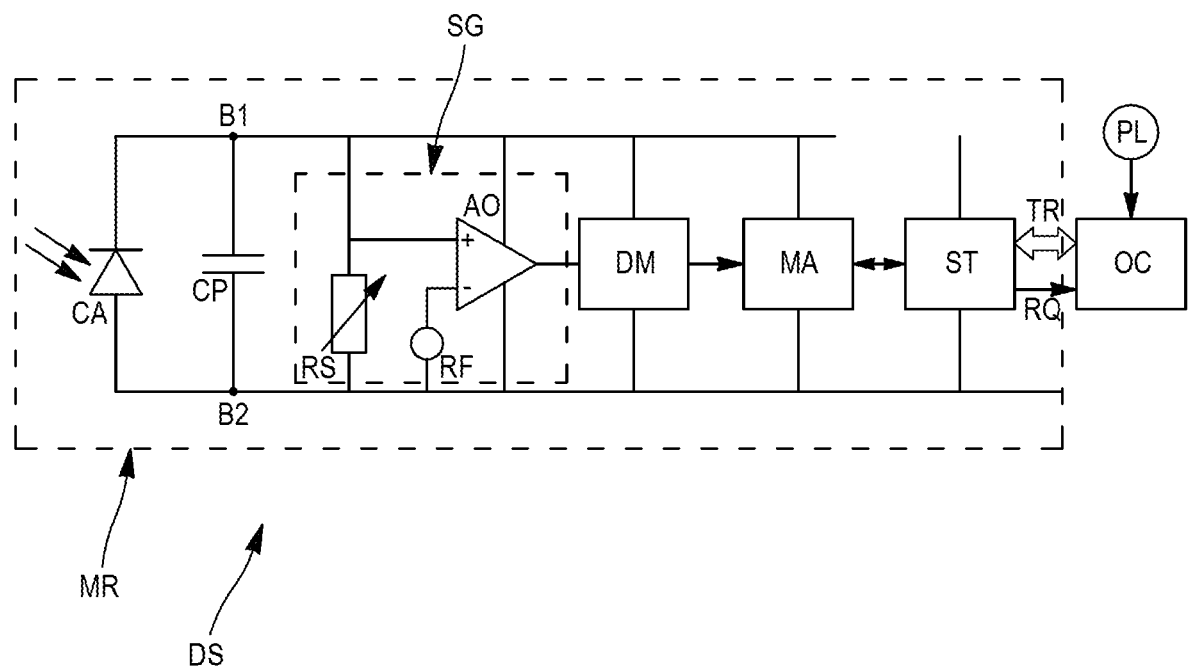

ELECTRONIC WATCH ALLOWING DATA TO BE RECEIVED

This application claims priority from European patent application No. 17174616.7 filed on Jun. 6, 2017, the entire disclosure of which is hereby incorporated herein by reference.

TECHNICAL FIELD

The present invention relates to the field of data transmission. The invention more particularly relates to an electronic watch allowing data to be received.

PRIOR ART

So-called "connected" watches, able to communicate with an electronic appliance such as a smartphone, have emerged in the watchmaking sector in recent years. Such a watch may be set or configured manually, in particular by activating pushbuttons, crowns and/or touch buttons, this being relatively inconvenient for the user or the after-sales service responsible for setting or configuration. For example, if the watch has a perpetual calendar mechanism, setting the position of the analogue display elements of the perpetual calendar mechanism, and more generally setting the perpetual calendar mechanism, may be carried out by pulling and/or turning a crown on the watch and/or by pressing one or more pushbuttons on the watch. Thus, a type of year (for example a leap year) is selected, and the various display elements, and more generally all of the elements of the perpetual calendar mechanism, are positioned correctly. This method is not only burdensome for the user, who has to correctly recall and execute all of the setting operations one after another, but it furthermore creates risks of errors and discrepancies.

To avoid these drawbacks, it is nowadays possible to set or configure an electronic watch automatically via an electronic appliance such as a smartphone for example, by providing the watch with a device that supports Bluetooth technology or a near-field communication technology. However, this type of device is quite complex to install, bulky, consumes a lot of energy and requires specific communication means, in particular antennas, to be installed both on the electronic appliance and on the watch. This device must also be certified according to current standards, thereby generating an additional expense.

As an alternative, sending setting data from an electronic appliance such as a smartphone to a watch by transmission via light has therefore been proposed. More particularly, the electronic appliance emits, via its screen or its camera flash, light pulses modulated by the setting or configuration data. The watch, which for its part must be provided with a receiver module including an optical sensor, and a demodulator, receives the modulated light pulses, then demodulates them to extract the setting or configuration data therefrom, and lastly performs the appropriate setting or configuration operation.

However, one drawback of this method is that the receiver module of the watch must be awoken manually, for example by pressing a pushbutton on the watch. Specifically, the cell of the electronic watch is used as the energy source for this receiver module, and the life of this cell would be greatly decreased if it had to supply the module with power continuously.

SUMMARY OF THE INVENTION

The aim of the present invention is to overcome these drawbacks by providing an electronic watch including a receiver module that is intended to receive setting or configuration data from an electronic appliance by transmission via light, said receiver module not needing to be manually awoken before transmission.

To this end, the invention provides an electronic watch such as defined in Claim 1.

The demodulator of the receiver module of the electronic watch according to the invention is supplied with power by energy from the the energy storage element, and not by the electrical energy source (this electrical energy source is advantageously the cell of the watch), which differentiates it from the prior art. As long as the optical sensor detects light rays and/or the electrical energy storage element contains energy, the receiver module remains in operation. Thus, the receiver module continuously seeks to detect data which might be transmitted by an emitting electronic appliance (unless it is in complete darkness).

The emitting electronic appliance is advantageously a smartphone, configured to emit a sequence of light pulses modulated by the data to be transmitted. The light pulses are for example emitted by the screen of the smartphone or by its camera flash.

It is therefore understood that the invention makes it possible to avoid having to wake up the receiver module manually (for example by pressing a pushbutton), and does so without negatively affecting the life of the electrical energy source.

Alternatively, the receiver module could be supplied with power solely by the energy of the light pulses at the moment when data transfer is to take place. This allows the optical sensor to avoid having to scan its surroundings continuously; instead it only has to do so after one or two seconds of illumination, which is the time required to fill the energy storage means and to supply power to the demodulator so that it wakes up and starts working. The receiver module then switches off once the transfer is complete. Of course, the exchange protocol must be adapted to have a preamble that is long enough to ensure that the module has woken up before the start of useful modulation. It should be noted that it is possible to transmit the data in multiple parts, and/or to send the same parts multiple times, and to reconstruct the whole message on the receiver device side.

Furthermore, the electronic watch may comprise the features contained in one, or in a technically feasible combination, of Claims 2 to 12.

BRIEF DESCRIPTION OF THE FIGURE

The aims, advantages and features of the invention will become more clearly apparent in the following detailed description of at least one embodiment of the invention, given solely by way of nonlimiting example and illustrated by the appended drawing, in which elements of an electronic watch according to the invention are shown.

DETAILED DESCRIPTION OF ONE EMBODIMENT

The FIGURE shows certain elements of an electronic watch DS. The electronic watch DS includes numerous elements, including an electrical energy source PL, for example an electric cell or a battery, and a control member OC supplied with power by said energy source PL. The control member OC is for example a microcontroller, hard-wired logic, a programmable logic device or else a microprocessor. When said watch has an analogue display, the control member OC controls a stepper motor (not shown), which is arranged to actuate gear-trains controlling the position of the analogue display means such as hands. In the case that a watch has a digital display, the control member OC controls the display.

The electronic watch DS further includes a receiver module MR, including the following elements:
- An optical sensor CA
- An energy storage element CP
- An automatic gain control system SG (optional)
- A demodulator DM
- An authentication module MA (optional)
- A data storage unit ST
- Transmission means TR.

By virtue of the receiver module MR, the electronic watch DS is suitable for receiving data from an emitting electronic appliance by transmission via light. These data are advantageously data for setting or configuring the watch. The emitting electronic appliance is advantageously a smartphone, configured to emit a sequence of light pulses modulated by the data to be transmitted. The light pulses are for example emitted by the screen of the smartphone or by its camera flash. The modulation is advantageously based on a Manchester code, for which there are no long pauses between light pulses. Specifically, it is sought to optimize the charging of the energy storage element CP by limiting the gaps between pulses.

The optical sensor CA produces, when it is exposed to radiation in the optical domain, an electrical signal. The optical sensor CA is for example a photodiode, a phototransistor or else a photovoltaic cell. The optical sensor CA may also be a combination of these elements in parallel and/or in series.

The energy storage element CP is a capacitor. The storage element CP is connected to the terminals of the optical sensor CA, so that it is charged when the optical sensor CA generates an electrical signal.

The automatic gain control system SG includes, in one nonlimiting embodiment, a variable resistor RS, an operational amplifier AO, and a reference voltage source RF. A positive power supply terminal of the operational amplifier AO is connected to a first terminal B1 of the storage element CP, while a negative power supply terminal is connected to a second terminal B2 of the storage element CP. Thus, the operational amplifier AO is arranged so as to be supplied with power by the storage element CP. Moreover, the noninverting input of the operational amplifier AO is connected to the first terminal B1, which is itself connected to the variable resistor RS. The variable resistor RS is connected on the other side to the second terminal B2. Regarding the inverting input of the operational amplifier AO, it is connected to the reference voltage source RF, said source RF being connected on the other side to the second terminal B2.

The demodulator DM is itself also arranged so as to be supplied with power by the storage element CP: one of its power supply terminals is linked to the first terminal B1, and the other of its power supply terminals is linked to the second terminal B2. Moreover, one input of the demodulator DM is connected to one output of the operational amplifier AO. One output of the demodulator DM is connected to the variable resistor RS and/or to the reference voltage source RF, to form a feedback loop allowing the value of the variable resistor RS and/or the reference value to be adjusted.

The authentication module MA is itself also arranged so as to be supplied with power by the storage element CP: one of its power supply terminals is linked to the first terminal B1, and the other of its power supply terminals is linked to the second terminal B2. Moreover, one input of the authentication module MA is connected to one output of the demodulator DM.

In one embodiment, the data storage unit ST is arranged so as to be supplied with power by the storage element CP: one of its power supply terminals is linked to the first terminal B1, and the other of its power supply terminals is linked to the second terminal B2. Alternatively, the data storage unit ST is supplied with power by the electrical energy source PL: one of its power supply terminals is linked to the electrical energy source PL, and the other of its power supply terminals is linked to the second terminal B2. In both cases however, one input of the data storage unit ST is connected to one output of the authentication module MA.

Lastly, the transmission means TR between the control member OC and the data storage unit ST are a serial link interface. Moreover, it should be noted that the transmission means TR are capable of transmitting requests RQ to the control member OC.

When the optical sensor CA is subjected to light radiation, it generates an electrical signal which charges the energy storage element CP. A portion of this energy is used to supply power to the automatic gain control system SG, the demodulator DM, the authentication module MA and the data storage unit ST.

In parallel, the electrical signal generated by the optical sensor CA is transmitted to the automatic gain control system SG, which allows the gain of the receiver module to be continuously adjusted so as to keep the electrical signal at a relatively constant amplitude level, regardless of the surrounding light conditions to which the light radiation is subject. Next, the electrical signal is transmitted to the demodulator DM, which attempts to extract data and potentially also clock information therefrom. Of course, if the light radiation does not correspond to any data (if it comes from a lamp or from the sun, for example), unusable data are transmitted from the demodulator DM to the authentication module MA. Upon receiving data, identification means of the authentication module MA attempt to recognize a reference identifier. Specifically, the receiver module MR has been paired beforehand with at least one emitting electronic appliance, such that the electronic appliance and the electronic watch share knowledge of the reference identifier. The emitting electronic appliance is configured to insert the reference identifier into the data it emits.

As long as the data received by the authentication module MA do not contain the reference identifier, nothing more happens. However, upon detecting the reference identifier, the data are transmitted to the data storage unit ST, which then sends a request to the control member OC. It should be noted that the data received by the authentication module MA are potentially encrypted, and for this reason the authentication module MA may further comprise decryption means. However, data decryption may be carried out at the control member OC. Lastly, when the control member OC receives a suitable request from the data storage unit ST, it accesses said unit ST via the transmission means TR. The data may be data for setting or configuring the watch. Thus, the control member may use said data to act on the stepper motor and adjust the position of the display means.

It will be understood that diverse modifications and/or improvements and/or combinations that are obvious to those skilled in the art may be made to the various embodiments of the invention presented above without departing from the scope of the invention defined by the appended claims.

What is claimed is:

1. An electronic watch, comprising:
an electrical energy source;
control circuitry configured to be supplied with power from the electrical energy source; and
a receiver including
an optical sensor configured to detect a sequence of light pulses modulated by data, and convert the sequence into a digital signal,
an energy storage element configured to store electrical energy generated by the optical sensor, the energy storage element being a capacitor,
a demodulator configured to be supplied with power only from at least one of the energy storage element and the optical sensor, but not from the electrical energy source, and configured to extract the data from the digital signal obtained from the optical sensor, and
a transmitter configured to transmit the extracted data to the control circuitry.

2. The electronic watch according to claim 1, further comprising an authentication circuit configured to be supplied with power from the energy storage element, the authentication circuit being connected to an output of the demodulator, and being configured to extract an identifier from the data and compare the extracted identifier with a reference identifier,
wherein the transmitter is further configured to transmit only those data that include the reference identifier.

3. The electronic watch according to claim 2, wherein the authentication circuit is further configured to decrypt the data.

4. The electronic watch according to claim 1, wherein the receiver further comprises a memory configured to be supplied with power from the energy storage element,
wherein the memory is connected to the authentication circuit, and is accessible by the control circuitry via the transmitter.

5. The electronic watch according to claim 4, wherein the memory is configured to be supplied with power from the electrical energy source.

6. The electronic watch according to claim 4, wherein the memory is configured to be supplied with power from the energy storage element.

7. The electronic watch according to claim 1, wherein the receiver further comprises an automatic gain control system configured to be supplied with power from the energy storage element and being connected between the optical sensor and the demodulator.

8. The electronic watch according to claim 1, wherein the demodulator is further configured to extract a clock signal from the digital signal.

9. The electronic watch according to claim 1, wherein the optical sensor is a photodiode.

10. The electronic watch according to claim 1, wherein the optical sensor is a phototransistor.

11. The electronic watch according to claim 1, Wherein the optical sensor is a photovoltaic cell.

12. The electronic watch according to claim 1, wherein the electrical energy source is a cell.

13. The electronic watch of claim 1, wherein the control circuitry is supplied power only from the electrical energy source.

* * * * *